(12) United States Patent
Nakano et al.

(10) Patent No.: US 11,172,070 B2
(45) Date of Patent: Nov. 9, 2021

(54) SYSTEM, INFORMATION PROCESSING APPARATUS, AND INFORMATION PROCESSING METHOD

(71) Applicant: TOYOTA JIDOSHA KABUSHIKI KAISHA, Toyota (JP)

(72) Inventors: Yuki Nakano, Nisshin (JP); Masato Ura, Nisshin (JP); Koji Takao, Toyota (JP); Hideyuki Sakurai, Toyota (JP); Keisuke Hotta, Miyoshi (JP); Rieko Masutani, Toyota (JP); Atsushi Hanawa, Miyoshi (JP); Masanobu Ohmi, Kasugai (JP); Takashi Hayashi, Nagoya (JP); Atsushi Nabata, Nagakute (JP); Tetsuro Sakaguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/099,949

(22) Filed: Nov. 17, 2020

(65) Prior Publication Data

US 2021/0160377 A1    May 27, 2021

(30) Foreign Application Priority Data

Nov. 21, 2019    (JP) .............................. JP2019-210792

(51) Int. Cl.
*H04M 11/04*    (2006.01)

(52) U.S. Cl.
CPC .................................. *H04M 11/04* (2013.01)

(58) Field of Classification Search
CPC ...................................................... H04M 11/04
USPC ............................................... 379/45, 37–44
See application file for complete search history.

(56) References Cited

U.S. PATENT DOCUMENTS

| 2018/0352085 A1* | 12/2018 | Philbin ................ H04M 3/5116 |
| 2019/0047462 A1* | 2/2019 | Vijayaraghavan .... B60W 30/00 |
| 2019/0365592 A1* | 12/2019 | Norton ..................... A61H 3/04 |

FOREIGN PATENT DOCUMENTS

JP        H06-169952 A       6/1994

* cited by examiner

*Primary Examiner* — Melur Ramakrishnaiah
(74) *Attorney, Agent, or Firm* — Oliff PLC

(57) ABSTRACT

A system includes a traveling unit provided with a movement mechanism; a plurality of types of main body units equipped with different facilities, each main body unit being configured to form an emergency vehicle by being coupled with the traveling unit; and an information processing apparatus configured to manage the traveling unit and the plurality of types of main body units. The information processing apparatus includes a processor configured to analyze details of a first emergency call made to a fire-fighting organization, select a main body unit of a first type equipped with a facility matching the details of the first emergency call from the plurality of types of main body units, and dispatch an emergency vehicle coupling the main body unit of the first type and the traveling unit.

18 Claims, 10 Drawing Sheets

FIG. 2
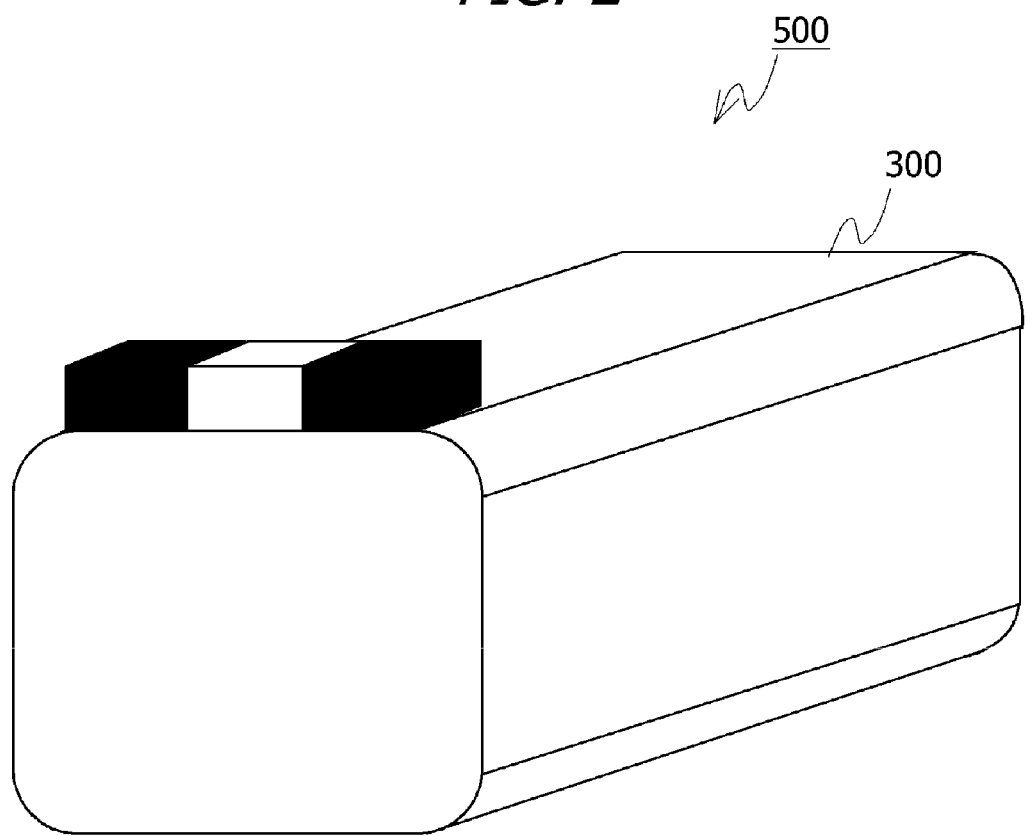
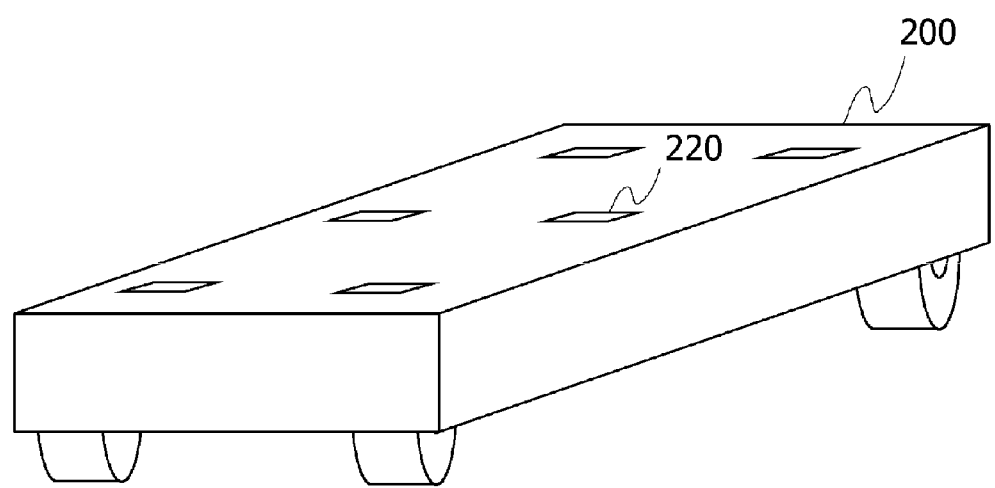

FIG. 6

DISPATCH VEHICLE INFORMATION TABLE

| TYPE OF EMERGENCY SITUATION | DISPATCH VEHICLE #1 | DISPATCH VEHICLE #2 |
|---|---|---|
| CAR ACCIDENT | TREATMENT ROOM SPECIFICATIONS | GENERAL AMBULANCE SPECIFICATIONS |
| FIRE | GENERAL AMBULANCE SPECIFICATIONS | |
| EXPLOSION | ORTHOPEDIC SURGERY ROOM SPECIFICATIONS | GENERAL AMBULANCE SPECIFICATIONS |
| EMERGENCY PATIENT (CRANIAL-NERVE) | CRANIAL-NERVE EXAMINATION ROOM SPECIFICATIONS | GENERAL AMBULANCE SPECIFICATIONS |
| EMERGENCY PATIENT (CARDIOVASCULAR) | CARDIOVASCULAR EXAMINATION ROOM SPECIFICATIONS | GENERAL AMBULANCE SPECIFICATIONS |

FIG. 7

VEHICLE DISPATCH STATUS TABLE

| ID | SPECIFICATIONS | DISPATCH STATUS | COUPLING COUNTERPART |
|---|---|---|---|
| MAIN BODY UNIT A | TREATMENT ROOM SPECIFICATIONS | ON STANDBY | — |
| MAIN BODY UNIT B | GENERAL AMBULANCE SPECIFICATIONS | DISPATCHED | RAVELING UNIT D |
| MAIN BODY UNIT C | ORTHOPEDIC SURGERY ROOM SPECIFICATIONS | ON STANDBY | — |
| TRAVELING UNIT D | — | DISPATCHED | MAIN BODY UNIT A |
| TRAVELING UNIT E | — | ON STANDBY | — |

SYSTEM, INFORMATION PROCESSING APPARATUS, AND INFORMATION PROCESSING METHOD

CROSS REFERENCE TO RELATED APPLICATION

This application claims the benefit of Japanese Patent Application No. 2019-210792, filed on Nov. 21, 2019, which is hereby incorporated by reference herein in its entirety.

BACKGROUND

Technical Field

The present disclosure relates to a system, an information processing apparatus, and an information processing method.

Description of the Related Art

There is disclosed an emergency medical care system for issuing a dispatch command to at least one of a vehicle for transporting a patient and a vehicle for treating a patient, in response to an instruction that is transmitted from a doctor at a time point of arrival of a vehicle for transporting a doctor, that is equipped with a first-aid facility, at a location where an emergency patient is present (for example, Patent document 1).

CITATION LIST

Patent Document

[Patent document 1] Japanese Patent Laid-Open No. H06-169952

An aspect of the disclosure is aimed at providing a system, an information processing apparatus, and an information processing method capable of sending, to a reported site, an emergency vehicle that is equipped with a facility matching details of an emergency call.

SUMMARY

One aspect of the present disclosure is a system including:
a traveling unit provided with a movement mechanism;
a plurality of types of main body units equipped with different facilities, each main body unit being configured to form an emergency vehicle by being coupled with the traveling unit; and
an information processing apparatus configured to manage the traveling unit and the plurality of types of main body units, wherein
the information processing apparatus includes a processor configured to:
analyze details of a first emergency call made to a fire-fighting organization;
select a main body unit of a first type equipped with a facility matching the details of the first emergency call from the plurality of types of main body units; and
dispatch an emergency vehicle coupling the main body unit of the first type and the traveling unit.

Another aspect of the present disclosure is an information processing apparatus including a processor configured to:
analyze details of a first emergency call made to a fire-fighting organization;
select a main body unit of a first type equipped with a facility matching the details of the first emergency call, from a plurality of types of main body units equipped with different facilities, each main body unit being configured to form an emergency vehicle by being coupled with a traveling unit provided with a movement mechanism; and
dispatch an emergency vehicle coupling the main body unit of the first type and the traveling unit.

Another aspect of the present disclosure is an information processing method comprising:
analyzing details of a first emergency call made to a fire-fighting organization;
selecting a main body unit of a first type equipped with a facility matching the details of the first emergency call, from a plurality of types of main body units equipped with different facilities, each main body unit being configured to form an emergency vehicle by being coupled with a traveling unit provided with a movement mechanism; and
dispatching an emergency vehicle coupling the main body unit of the first type and the traveling unit.

According to the present disclosure, an emergency vehicle that is equipped with a facility matching details of an emergency call may be sent to a reported site.

BRIEF DESCRIPTION OF DRAWINGS

FIG. 2 is a diagram illustrating an example of a separable vehicle that is used as the emergency vehicle in the emergency-vehicle dispatch management system according to the first embodiment;

FIG. 6 is an example of a dispatch vehicle information table;

FIG. 7 is an example of the vehicle dispatch status table;

DESCRIPTION OF THE EMBODIMENTS

Figure 1:
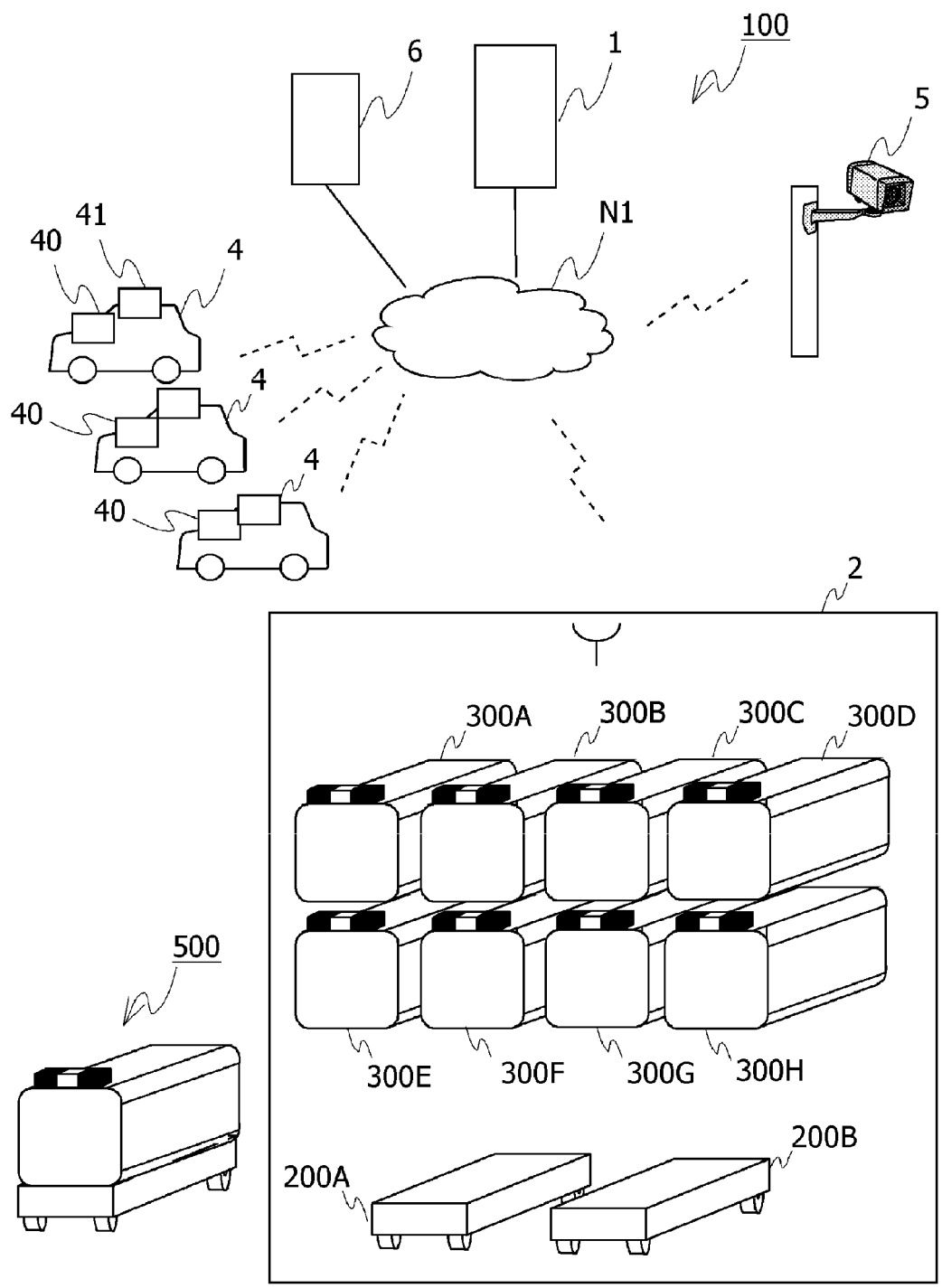
FIG. 1 is a diagram illustrating an example system configuration of an emergency-vehicle dispatch management system according to a first embodiment.

An aspect of the present disclosure is a system including: a traveling unit provided with a movement mechanism; a plurality of types of main body units equipped with different facilities, each main body unit being configured to form an emergency vehicle by being coupled with the traveling unit; and an information processing apparatus configured to manage the traveling unit and the plurality of types of main body units. The information processing apparatus includes a processor configured to: analyze details of a first emergency call made to a fire-fighting organization, select a main body unit of a first type equipped with a facility matching the details of the first emergency call from the plurality of types of main body units, and dispatch an emergency vehicle coupling the main body unit of the first type and the traveling unit.

For example, the traveling unit and the plurality of main body units are, but not limited to be, stationed at a fire-fighting organization such as a fire department. The main body unit is a main body unit of a vehicle that functions as an ambulance, for example. However, such a case is not restrictive, and the main body unit may be a main body unit of a vehicle that functions as a fire engine or another emergency vehicle, for example. In a case where the main body unit is a main body unit of a vehicle that functions as an ambulance, types of the main body unit may include those according to specifications of a facility of a general ambulance, and those according to specifications of a treatment room, a surgery room or an examination room of a corresponding hospital department, for example. However, the types of the main body unit are not limited to the above.

According to one aspect of the present disclosure, an emergency vehicle equipped with a facility matching details of a report to a fire-fighting organization is dispatched to a site concerned, and an emergency situation may be more swiftly handled. Furthermore, according to one aspect of the present disclosure, a vehicle where the traveling unit and the main body unit are separate units is adopted as an emergency vehicle, and thus, the number of traveling units to be prepared may be made smaller in relation to the number of main body units. Accordingly, a storage space for the traveling units, a cost related to the traveling units, and the like may be reduced.

According to one aspect of the present disclosure, the processor of the information processing apparatus may be configured to analyze a captured image of a camera existing in a periphery of an occurrent site of an emergency situation corresponding to the first emergency call, and check a state of the occurrence site of the emergency situation, and to select the main body unit of the first type based on an analysis result of the details of the first emergency call and an analysis result of the captured image of the camera.

The captured image of a camera existing in a periphery of an occurrence site of an emergency situation may be a captured image of a security camera installed on a road, a shop or the like, or a captured image of a camera mounted on a vehicle, for example. Furthermore, an image posted on an SNS and including position information of a periphery of the occurrence site may also be used.

For example, because the first emergency call is made by a person, information is possibly not accurately communicated due to the reporting person being shaken. According to one aspect of the present disclosure, an analysis result of a captured image of a camera in the periphery of an occurrence site is also taken into account at the time of selecting the main body unit of the first type, and thus, a situation at the site concerned may be more accurately grasped, and a main body unit of a more suitable type may be dispatched.

According to one aspect of the present disclosure, the processor of the information processing apparatus may be configured to acquire medical record information of a target person of emergency transport that is based on the first emergency call, and to select the main body unit of the first type based on the medical record information of the target person of the emergency transport. The medical record information may be acquired by issuing an inquiry to each medical organization or an organization, of a local authority, managing health insurance claims, for example.

In a case where a reporting person and the target person of emergency transport are strangers, or in a case where the reporting person is the target person but he/she is in no state to speak with accuracy, that the target person has a chronic disease may be not communicated, for example. Checking the medical record information of the target person of emergency transport enables a chronic disease of the target person to be specified, for example, and a cause of a current symptom may thus be speculated, and a main body unit of a type more suitable for the state of the target person may be dispatched.

According to one aspect of the present disclosure, the processor of the information processing apparatus may be configured to analyze a captured image of a camera provided on at least one of the main body unit of the first type and the traveling unit, the captured image capturing surroundings of an occurrence site of an emergency situation corresponding to the first emergency call, and determine additional dispatch of an emergency vehicle. Analyzing captured images of cameras on the first main body unit and the traveling unit in real time allows the situation at the occurrence site of the emergency situation to be grasped in real time, and an additional emergency vehicle may be more swiftly dispatched.

According to one aspect of the present disclosure, in a case where there is a shortage, at a first fire department having jurisdiction over an occurrence site of the emergency situation, regarding at least one of the main body unit of the first type and the traveling unit to be dispatched, the processor of the information processing apparatus may be configured to transmit a dispatch command to at least one of the main body unit of the first type and the traveling unit stationed at a fire department near the first fire department. Accordingly, for example, even in a case where there is a shortage of the main body unit of the first type or the traveling unit to be dispatched at a fire department having jurisdiction over a target location of the first emergency call, the main body unit of the first type or the traveling unit may be dispatched from another fire department close by. An additional emergency vehicle may thereby be swiftly dispatched.

According to one aspect of the present disclosure, the information processing apparatus may further include a memory configured to store correspondence between a type of details of an emergency call and a type of a main body unit to be dispatched, and the processor of the information processing apparatus may be configured to determine the main body unit of the first type matching the details of the first emergency call based on the correspondence stored in the memory. The main body unit of the first type may thereby be swiftly determined.

Alternatively, according to one aspect of the present disclosure, the processor of the information processing apparatus may be configured to input a parameter obtained from the details of the first emergency call to a learning model learned using a parameter obtained from an emergency call and a type of a main body unit to be dispatched, and determine the main body unit of the first type. A flexible handling according to the details of the first emergency call is thereby enabled.

According to one aspect of the present disclosure, the processor of the information processing apparatus may be configured to collect a captured image of an on-board camera or a fixed camera existing within a jurisdictional range, and monitor occurrence of a second emergency situation within the jurisdictional range, to select, in a case where there is occurrence of the second emergency situation within the jurisdictional range, a main body unit of a second type equipped with a facility matching the second emergency situation from the plurality of types of main body units, and to dispatch an emergency vehicle coupling the main body unit of the second type and the traveling unit. The fixed camera may be any of a security camera installed at a shop, a camera installed on a road, and the like, for example.

When the information processing apparatus itself monitors a captured image of an on-board camera or a fixed camera within the jurisdictional range, and detects occurrence of an emergency situation, an emergency vehicle may be dispatched to an occurrence site of an emergency situation without waiting for an emergency call.

Hereinafter, embodiments of the present disclosure will be described with reference to the drawings. Configurations of the embodiments below are merely examples, and the present disclosure is not limited to the configurations of the embodiments.

First Embodiment

FIG. 1 is a diagram illustrating an example system configuration of an emergency-vehicle dispatch management system 100 according to a first embodiment. The emergency-vehicle dispatch management system 100 is a system for causing a main body unit matching an emergency call made to a fire-fighting organization to be coupled with a traveling unit and to be dispatched as an emergency vehicle, for example. An emergency call is made to request for dispatch of an emergency vehicle in case of occurrence of an emergency situation. An emergency situation is an incident, an accident, a disaster, or occurrence of an emergency patient, for example. However, the emergency situation is not limited to the above.

For example, the emergency-vehicle dispatch management system 100 includes a center server 1, a plurality of traveling units 200 and a plurality of main body units 300 stationed at each of a plurality of fire departments under jurisdiction of a fire department headquarters corresponding to the center server 1, a plurality of vehicles 4, a plurality of fixed cameras 5, and a medical record management server 6. In FIG. 1, one fire department, traveling units 200A and 200B and main body units 300A to 300H stationed at the fire department, and one fixed camera are illustrated for the sake of convenience. In the case of not distinguishing between the traveling units 200A and 200B, and the main body units 300A to 300H, terms "traveling unit(s) 200" and "main body unit(s) 300" will be used, respectively.

The traveling unit 200 and the main body unit 300 form one vehicle 500 by being coupled together. That is, in the first embodiment, a separable vehicle is assumed to be used as the emergency vehicle 500. The traveling unit 200 is a vehicle that is capable of unmanned autonomous driving, for example. Furthermore, the traveling unit 200 is a motor-driven electric vehicle. However, the traveling unit 200 may be a manned driving vehicle, or an engine-driven vehicle, without being limited to the above.

The main body unit 300 does not include a function of traveling independently, and is a unit equipped with a facility for implementing a function of an ambulance, a fire engine or the like, for example. The main body units 300A to 300H each may be equipped with different facilities, or some main body units 300 may be equipped with a same facility, for example. That the facilities of the main body units 300 are different may be rephrased as types of the main body units 300 being different.

In the first embodiment, a description will be given of an example of a case where an ambulance, among emergency vehicles, is to be dispatched. For example, in a case where the main body unit 300 is to implement the function of an ambulance, types of specifications of the main body unit 300 may be specifications of a general ambulance, specifications of a treatment room, an examination room or a surgery room of a corresponding hospital department, or specifications of a patient's room, for example.

The vehicle 4 includes an on-board camera 41 and an on-board unit 40, for example. The on-board unit 40 transmits a captured image and position information of the on-board camera 41 to the center server 1 every predetermined period. The fixed camera 5 is a roadside camera installed by a predetermined organization for predetermined purposes, or a security camera installed at a predetermined shop or at home, for example. The fixed camera 5 transmits a captured image of a specified length to the center server 1, in response to an inquiry from the center server 1, for example.

The medical record management server 6 is a server holding medical record information at a medical organization. The medical record management server 6 transmits the medical record information of a target person, in response to an inquiry from the center server 1.

The center server 1, the traveling unit 200, the main body unit 300, the on-board unit 40 mounted in the vehicle 4, the fixed camera 5, and the medical record management server 6 are connected to a network N1 such as the Internet, and are capable of communicating with each other over the network N1, for example.

In Japan, an emergency call is made through public switched telephone network (PSTN). For example, an emergency call is made by dialing 119 on a phone or by pressing an emergency call button on a pay phone. The emergency call is first connected to a communication operation room of a fire department headquarters in charge of fire-fighting operations at a location where the emergency call is made from. In the communication operation room, the dispatch command for an ambulance or a fire engine is transmitted to a fire department having jurisdiction over an occurrence site of an emergency situation, according to details of a report. An emergency vehicle is thereby dispatched from a jurisdictional fire department.

In the first embodiment, the center server 1 is a server that is provided at a predetermined fire department headquarters, or a server, of an organization commissioned by the predetermined fire department headquarters, that operates in coordination with the communication operation room of the fire department headquarters. The center server 1 analyzes audio data of an emergency call made to the fire department headquarters, determines the main body unit of a first type matching details of the emergency call, and transmits a coupling command and the dispatch command to the main body unit 300 of the first type and the traveling unit 200 stationed at a fire department having jurisdiction over an occurrence site of the emergency situation.

For example, in a case where details of the emergency call indicate an accident, an incident or a disaster, in addition to the details of the report, the center server 1 collects and analyzes captured images of the on-board camera 41 of the vehicle 4 and the fixed camera 5 existing in a periphery of the site of the emergency situation, and grasps a situation at the site. The center server 1 determines the type of the main body unit 300 to be dispatched, according to the details of the emergency call and the situation grasped from the captured images of surroundings of the site. For example, in a case where the details of the emergency call indicate a car accident, a main body unit 300 matching specifications of a treatment room for orthopedic surgery is selected. For example, in a case where the details of the report indicate a stabbing incident, a main body unit 300 matching specifications of a surgery room for surgery is selected. The type of the selected main body unit 300 that is to be dispatched is an example of "first type".

For example, in a case where the details of the report indicate occurrence of an emergency patient, the center server 1 acquires, from the medical record management server 6, medical record information of the patient who is an individual identified from the details of the emergency call, and determines the type of the main body unit 300 that is to be dispatched, on the basis of the medical record information. The medical record information may be electronic medical chart information held by a medical organization, health insurance claims information kept at a health insurance society, or the like, for example. In a case where latest medical record information of the patient is related to cranial nerves, and a symptom acquired from the details of the emergency call is determined to be caused by a cranial nerve disease, for example, a main body unit 300 matching specifications of a treatment room for neurosurgery is selected.

Furthermore, in the first embodiment, the center server 1 analyzes a captured image of a camera mounted on the traveling unit 200 or the main body unit 300 that are dispatched first, and monitors a situation at the reported site. Hereinafter, the emergency vehicle 500 that is formed by the traveling unit 200 and the main body unit 300 that is dispatched first will be referred to as an advance vehicle. When additional dispatch of an emergency vehicle is determined from an analysis result of the captured image of the camera mounted on the advance vehicle, the center server 1 selects the main body unit 300 of a type according to the analysis result, and transmits the coupling command and the dispatch command to corresponding traveling unit 200 and main body unit 300.

Furthermore, in a case where there is a shortage regarding the traveling unit 200 or the main body unit 300 of the first type at the fire department having jurisdiction over the occurrence site of the emergency situation, the coupling command and the dispatch command are transmitted to the traveling unit or the main body unit 300 of the first type stationed at a fire department near the jurisdictional fire department.

According to the emergency-vehicle dispatch management system 100 according to the first embodiment, the emergency vehicle 500 equipped with a facility suitable for an emergency situation is dispatched according to the details of an emergency call, and thus, an emergency situation that occurred may be more swiftly handled. Moreover, the emergency vehicle 500 of the emergency-vehicle dispatch management system 100 according to the first embodiment is a separable vehicle, and thus, the number of traveling units 200 to be stationed at each fire department in relation to the main body units 300 may be reduced. A cost related to the traveling units 200, a storage space for the traveling units 200, and the like may thus be reduced.

<Separable Vehicle>

FIG. 2 is a diagram illustrating an example of a separable vehicle that is used as the emergency vehicle 500 in the emergency-vehicle dispatch management system 100 according to the first embodiment. In the first embodiment, a separable vehicle that is separated into the main body unit and the traveling unit is assumed to be used as the emergency vehicle 500.

For example, as illustrated in FIG. 2, the separable vehicle may be a vertically separable vehicle 500 having the main body unit 300 mounted on the traveling unit 200. However, the separable vehicle is not limited to the vertically separable vehicle. For example, a front-back separable vehicle where the traveling unit is coupled to a front of the main body unit and travels while pulling the main body unit may also be used.

For example, with the vertically separable vehicle 500 illustrated in FIG. 2, the traveling unit 200 is provided with a plurality of protrusions 220. In a state where the main body unit 300 is separated, the protrusions 220 are housed inside a main body of the traveling unit 200, and the protrusions 220 protrude out at the time of being coupled with the main body unit 300. Fitting parts for the protrusions 220 are provided on a bottom surface of the main body unit 300, and are fitted with the protrusions 220 to thereby fix the main body unit 300 to the traveling unit 200. Additionally, a coupling method of the traveling unit 200 and the main body unit 300 is not limited to the above, and any existing technique may be used. For example, as the coupling method of the traveling unit 200 and the main body unit 300, there is a method of using electromagnets.

Furthermore, as a method, used by the vertically separable vehicle 500, of loading the main body unit 300 on the traveling unit 200 or of unloading the main body unit 300 from the traveling unit 200, a method of using a dedicated lift, a method of using a mechanism for loading or unloading provided on the main body unit 300 or the traveling unit 200 itself, or the like may be cited. As one specific example, there is a method of providing a mechanism for lifting the main body unit 300, such as a jack, on a lower part on a side surface of the main body unit 300. In this case, the traveling unit 200 moves to under the main body unit 300 while the main body unit 300 is being lifted by the jack, and the main body unit 300 is then lowered to be loaded on the traveling unit 200. Additionally, the method, used by the vertically separable vehicle 500, of loading the main body unit 300 on the traveling unit 200 or of unloading the main body unit 300 from the traveling unit 200 is not limited to a specific method.

Figure 3:
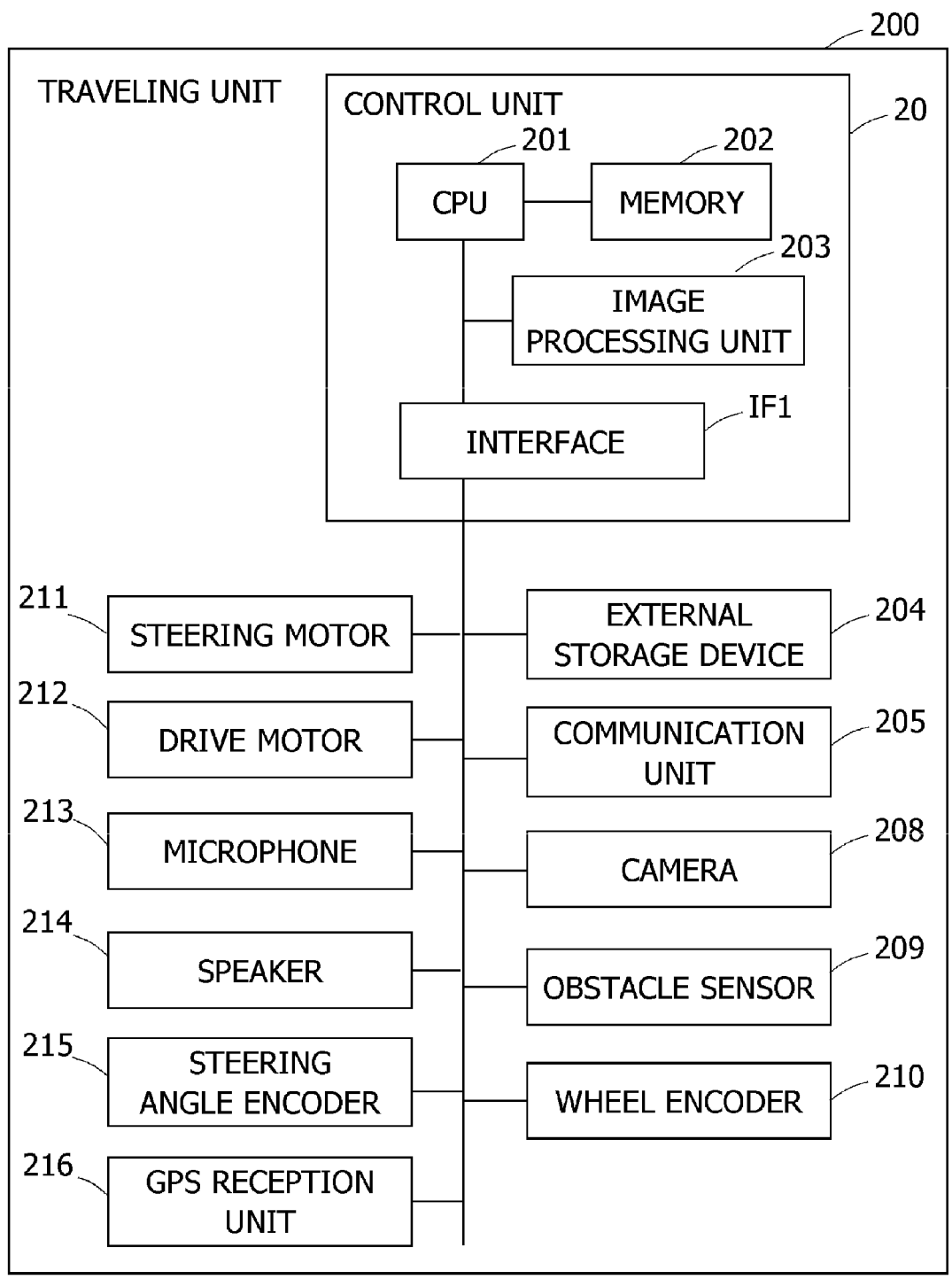
FIG. 3 is a diagram illustrating an example hardware configuration of the traveling unit.

FIG. 3 is a diagram illustrating an example hardware configuration of the traveling unit 200. In the first embodiment, the traveling unit 200 is assumed to be an electric vehicle that is capable of autonomous driving. Accordingly, FIG. 3 is a diagram of a case where the traveling unit 200 is assumed to be an electric vehicle that is capable of autonomous driving. Additionally, in FIG. 3, hardware related to a control system of the traveling unit 200 is extracted and illustrated.

For example, the traveling unit 200 includes a control unit 20, an external storage device 204, a communication unit 205, a camera 208, an obstacle sensor 209, a wheel encoder 210, a steering motor 211, a drive motor 212, a microphone 213, a speaker 214, a steering angle encoder 215, and a global positioning system (GPS) reception unit 216.

The control unit 20 is also referred to as an electronic control unit (ECU). The control unit 20 includes a CPU 201, a memory 202, an image processing unit 203, and an interface IF1. The external storage device 204, the communication unit 205, the camera 208, the obstacle sensor 209, the wheel encoder 210, the steering motor 211, the drive motor 212, the microphone 213, the speaker 214, the steering angle encoder 215, and the GPS reception unit 216 are connected to the interface IF1.

The obstacle sensor 209 is an ultrasonic sensor, a radar or the like. The obstacle sensor 209 transmits ultrasonic waves, electromagnetic waves or the like in a detection target direction, and detects, on the basis of reflected waves, presence, position, relative speed and the like of an obstacle in the detection target direction. Obstacles include pedestrians, bicycles, structures, buildings and the like, for example. In a case where the traveling unit 200 is box-shaped, as illustrated in FIG. 2, a plurality of obstacle sensors 209 are provided, and the plurality of obstacle sensors 209 are each provided at positions near four front, back, left and right corner portions of the traveling unit 200, for example. Additionally, the front, back, left and right of the traveling unit 200 are determined on the basis of a traveling direction, for example.

The camera 208 is a capturing device that uses an image sensor such as a charge-coupled device (CCD), a metal-oxide-semiconductor (MOS), a complementary metal-oxide-semiconductor (CMOS) or the like. The camera 208 acquires an image every predetermined period called frame period, and stores the image in a frame buffer in the control unit 20. A plurality of cameras 208 are provided on the traveling unit 200, and the plurality of cameras 208 are installed on front, back, left and right side surfaces of the traveling unit 200 while facing outward, for example.

The steering motor 211 controls, according to an instruction signal from the control unit 20, an angle of a direction of an intersecting line along which a rotating surface of a wheel and a horizontal plane intersect, or in other words, a traveling direction of rotation of the wheel. The drive motor 212 drives and rotates each wheel provided on the traveling unit 200, according to an instruction signal from the control unit 20, for example. However, the drive motor 212 may drive one pair of wheels among two pairs of front and rear wheels.

The steering angle encoder 215 detects a steering angle that is the traveling direction of a wheel at predetermined detection time intervals, and stores the steering angle in a register of the control unit 20. The steering angle is an angle of a rotation axis of the wheel on the horizontal plane. For example, an origin of the angle is set at which a direction of the rotation axis of the wheel is perpendicular to the traveling direction of the traveling unit 200. Furthermore, the wheel encoder 210 acquires a rotation angle of the wheel at predetermined detection time intervals, and stores the rotation angle in the register of the control unit 20.

The communication unit 205 is a communication unit that connects to a WiFi access point or a mobile phone base station, for example, and that communicates with various servers and the like on a network through a public communication network connected to the WiFi access point or the mobile phone base station. The communication unit 205 performs wireless communication using wireless signals and a wireless communication method according to a predetermined wireless communication standard.

The GPS reception unit 216 receives radio waves carrying time signals from a plurality of global positioning satellites orbiting the Earth, and stores the time signals in the register of the control unit 20. The microphone 213 detects sound, converts the sound into a digital signal, and stores the digital signal in the register of the control unit 20. The speaker 214 is driven by a D/A converter and an amplifier connected to the control unit 20 or a signal processing unit, and reproduces acoustics including sound and voice.

The CPU 201 of the control unit 20 executes a computer program that is loaded into the memory 202 in an executable manner, and performs processing as the control unit 20. The memory 202 stores computer programs to be executed by the CPU 201, data to be processed by the CPU 201, and the like. For example, the memory 202 is a dynamic random access memory (DRAM), a static random access memory (SRAM), a read only memory (ROM) or the like. The image processing unit 203 processes, in coordination with the CPU 201, data in the frame buffer that is acquired from the camera 208 every predetermined frame period. The image processing unit 203 includes a GPU and an image memory as the frame buffer, for example. The external storage device 204 is a non-volatile memory, and is a solid state drive (SSD), a hard disk drive or the like.

For example, the control unit 20 acquires detection signals from a sensor of each unit of the traveling unit 200 via the interface IF1. Furthermore, the control unit 20 calculates latitude and longitude indicating a position on the Earth, from detection signals from the GPS reception unit 216. Furthermore, the control unit 20 acquires map data from a map information database stored in the external storage device 204, checks the calculated latitude and longitude against a position in the map data, and determines a current location. Moreover, the control unit 20 acquires a route from the current location to a destination in the map data. Moreover, the control unit 20 detects an obstacle in the surroundings of the traveling unit 200 on the basis of a signal from the obstacle sensor 209, the camera 208 or the like, determines the traveling direction to avoid the obstacle, and controls the steering angle.

Furthermore, the control unit 20 processes, in coordination with the image processing unit 203, an image acquired from the camera 208, on a per-frame data basis, detects a change on the basis of a difference between images, for example, and recognizes an obstacle. Additionally, the control unit 20 may transmit frame data of an image of the camera 208 and audio data obtained from the microphone 213, from the communication unit 205 to the center server 1 on a network. Then, analysis of the frame data of the image and the audio data may be assigned to the center server 1.

FIG. 3 illustrates the interface IF1, but exchange of signals between the control unit 20 and a control target is not limited to be performed through the interface IF1. That is, the control unit 20 may include a plurality of signal exchange paths other than the interface IF1. Furthermore, in FIG. 3, the control unit 20 includes a single CPU 201. However, the CPU is not limited to a single processor, and may have a multi-processor configuration. Alternatively, a single CPU connected by a single socket may have a multi-core configuration. At least a part of processes by each unit described above may be performed by a processor other than the CPU, such as a dedicated processor such as a digital signal processor (DSP) or a graphics processing unit (GPU). Furthermore, at least a part of processes by each unit described above may be performed by an integrated circuit (IC) or another digital circuit. An analog circuit may be included in at least one of the units described above.

The main body unit 300 includes a control unit, a camera, a microphone, a speaker, a GPS reception unit, a communication unit and the like similar to those of the control unit 20 of the traveling unit 200. These are as described in relation to the hardware configuration of the traveling unit 200, and a description thereof is omitted.

<Device Configuration>

Figure 4:
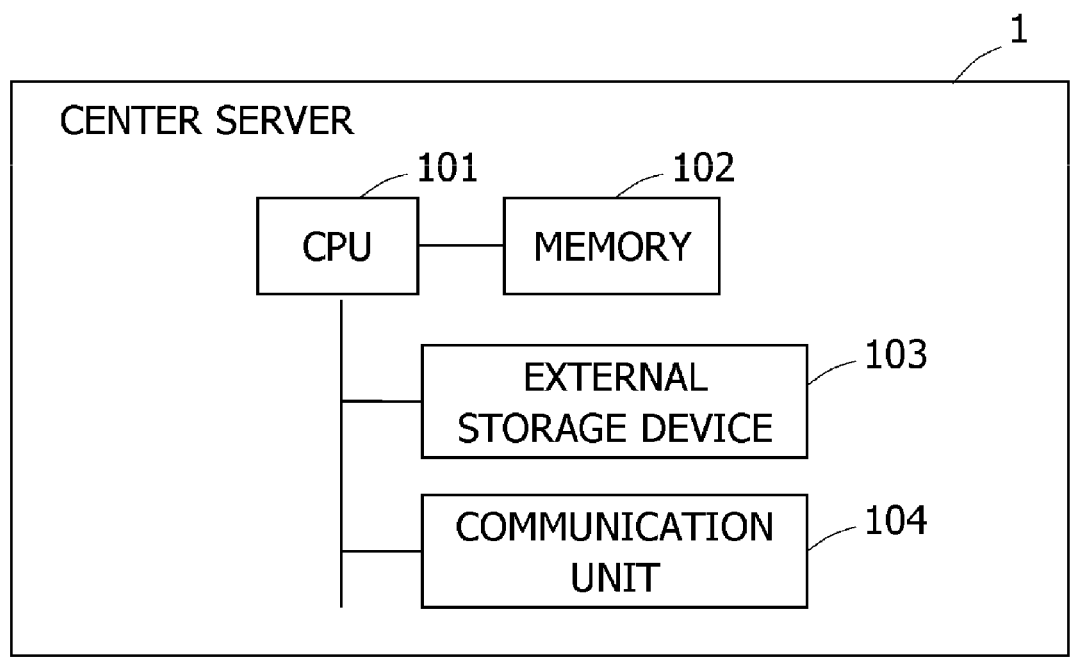
FIG. 4 is a diagram illustrating an example hardware configuration of the center server according to the first embodiment.

FIG. 4 is a diagram illustrating an example hardware configuration of the center server 1 according to the first embodiment. For example, the center server 1 is a dedicated computer or a general-purpose computer. As hardware configuration, the center server 1 includes a central processing unit (CPU) 101, a memory 102, an external storage device 103, and a communication unit 104. The memory 102 and the external storage device 103 are computer-readable recording media. The center server 1 is an example of "information processing apparatus".

The external storage device 103 stores various programs, and data that is used by the CPU 101 at the time of execution of each program. For example, the external storage device 103 is an erasable programmable ROM (EPROM) or a hard disk drive. Programs held in the external storage device 103 include the operating system (OS), a control program of the emergency-vehicle dispatch management system 100, and various other application programs, for example. The control program of the emergency-vehicle dispatch management system 100 is a program for analyzing details of an emergency call, and for dispatching the emergency vehicle 500 including the main body unit 300 that is equipped with a facility matching the details of the emergency call.

The memory 102 is a main memory that provides, to the CPU 101, a storage area and a work area for loading programs stored in the external storage device 103, and that is used as a buffer. For example, the memory 102 includes a semiconductor memory such as a read only memory (ROM) or a random access memory (RAM).

The CPU 101 performs various processes by loading the OS and various application programs held in the external storage device 103 into the memory 102 and executing the same. The number of CPUs 101 is not limited to one, and a plurality of CPUs may be provided. The CPU 101 is an example of "processor" of "information processing apparatus".

The communication unit 104 is an interface through which information is input to/output from a network. The communication unit 104 may be an interface that is connected to a cable network, or may be an interface that is connected to a wireless network. For example, the communication unit 104 is a network interface card (NIC) or a radio circuit. For example, the communication unit 104 connects to a local area network (LAN), connects to a public network through the LAN, and communicates with various servers, the traveling unit 200 and the main body unit 300 on the network through the public communication network.

Additionally, the hardware configuration of the center server 1 illustrated in FIG. 4 is merely an example and is not limited to the above, and omission, replacement and addition of elements may be performed as appropriate according to the embodiment. For example, the center server 1 may include a removable recording medium drive device, and may execute programs recorded in a removable recording medium. The removable recording medium is a recording medium such as an SD card, a mini SD card, a micro SD card, a universal serial bus (USB) flash memory, a compact disc (CD), a digital versatile disc (DVD), a Blu-ray (registered trademark) disc, or a flash memory card, for example. Moreover, the center server 1 may include an input device and an output device, for example. The input device is a keyboard, a mouse, or a touch panel, for example. The output device is a display, for example.

Figure 5:
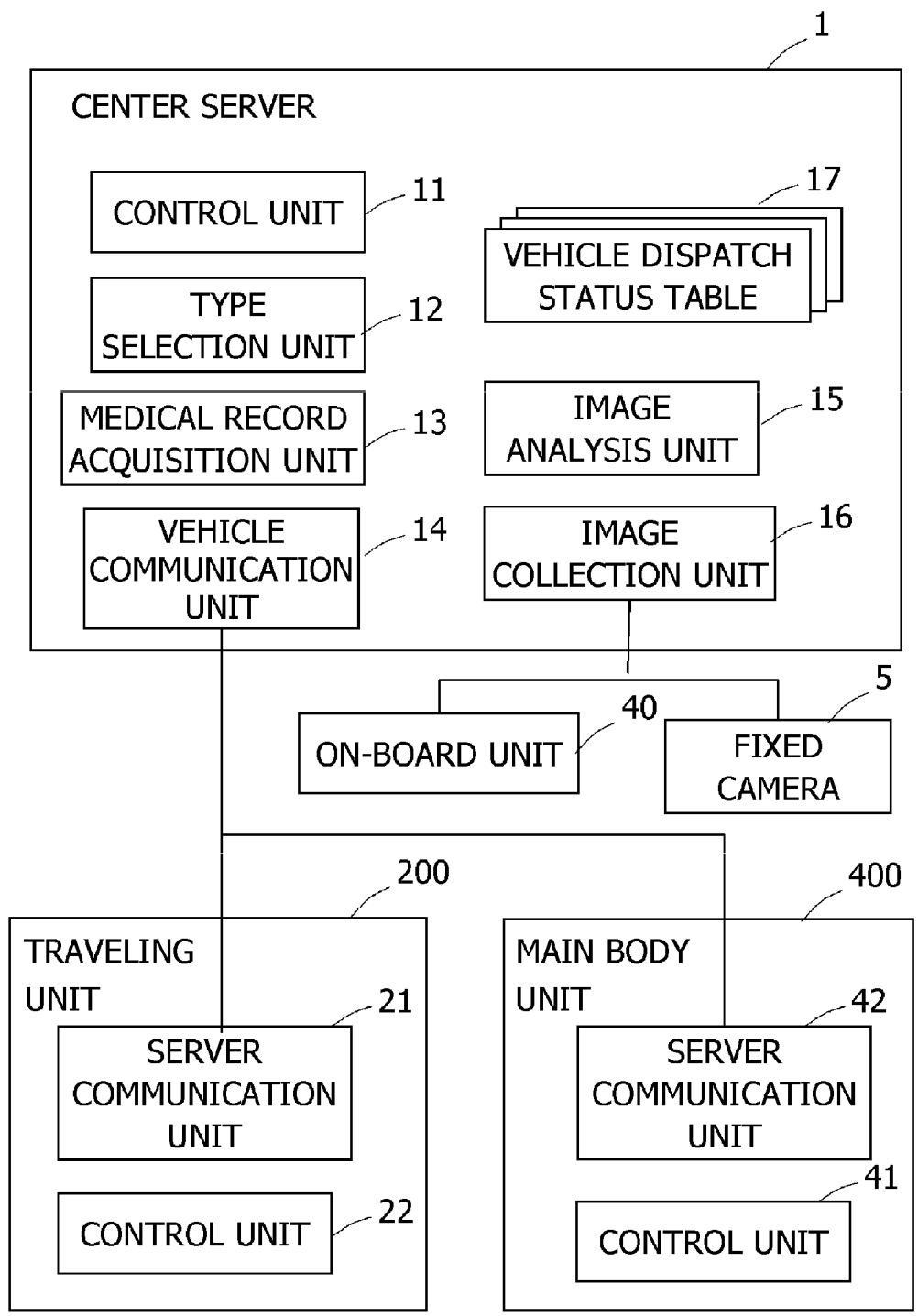
FIG. 5 is a diagram illustrating example functional configurations of the center server, the traveling unit, and the main body unit in the emergency-vehicle dispatch management system.

FIG. 5 is a diagram illustrating example functional configurations of the center server 1, the traveling unit 200, and the main body unit 300 in the emergency-vehicle dispatch management system 100. As functional elements, the center server 1 includes a control unit 11, a type selection unit 12, a medical record acquisition unit 13, a vehicle communication unit 14, an image analysis unit 15, an image collection unit 16, and a vehicle dispatch status table 17. These functional elements are implemented by the CPU 101 of the center server 1 executing control programs of the emergency-vehicle dispatch management system 100 stored in the external storage device 103, for example.

The vehicle communication unit 14 is an interface to the main body unit 300 and the traveling unit 200. For example, the vehicle communication unit 14 transmits data input from the control unit 11 to the main body unit 300 and the traveling unit 200. Furthermore, the vehicle communication unit 14 outputs data received from the main body unit 300 or the traveling unit 200 to the control unit 11.

For example, the image collection unit 16 acquires captured images from the on-board camera 41 of the vehicle 4 and the fixed camera 5, every predetermined period or in response from a request from the control unit 11. The image collection unit 16 outputs the acquired captured images to the image analysis unit 15.

The image analysis unit 15 is an engine for performing image analysis on a captured image input from the image collection unit 16. For example, the image analysis unit 15 outputs a result of the image analysis to the control unit 11. For example, as a result of image analysis, a type of an emergency situation, the number of target persons of emergency transport, an occurrence location, and the like are acquired. The type of an emergency situation acquired by image analysis may be a fire, a car accident, a railway accident, an explosion, occurrence of an emergency patient, a disaster or the like. However, the types of emergency situations acquired by image analysis are not limited to the above. Additionally, an image analysis method of the image analysis unit 15 is not limited to a specific method.

For example, when an emergency call is received, the control unit 11 analyzes audio data of the emergency call, and specifies details of the emergency call. Additionally, the emergency call may be directly received by the center server 1, or a reception device for emergency calls may be separately provided, and the audio data of the emergency call may be transferred from the reception device to the center server 1. Furthermore, a method of analyzing the audio data of an emergency call is not limited to a specific method. For example, an audio analysis engine or artificial intelligence may be used for analysis of the audio data of an emergency call. Alternatively, details of a report may be input by a staff member who responds to emergency calls.

By the analysis of the audio data of the emergency call by the control unit 11, the type of an emergency situation, the occurrence location, an attribute of a target person of emergency transport, a state of the target person of emergency transport, a reception time of the emergency call, and the like are acquired as the details of the emergency call, for example. Hereinafter, the occurrence location will also be referred to as "site". Types of emergency situations include an incident, an accident, a disaster, occurrence of an emergency patient, and the like, for example. These types of emergency situations may be further categorized. Further categories of the types of emergency situations include an incident between persons, such as a stabbing incident or a violent incident, a car accident, an explosion, a fire, a railway accident, a landslide and the like, for example. Attributes of a target person of emergency transport include sex, age, body shape and the like, for example. Additionally, any of the above may be absent from the details of an emergency call.

Furthermore, the control unit 11 monitors analysis results, from the image analysis unit 15, of captured images of the on-board camera 41 and the fixed camera 5, and detects occurrence of an emergency situation within a jurisdictional range from the analysis results of the captured images. The control unit 11 also detects the type of the emergency situation, the occurrence location and the like, in addition to detecting occurrence of the emergency situation.

For example, in a case where the emergency situation is an accident, an incident or a disaster, the control unit 11 instructs the image collection unit 16 to collect captured images of the on-board camera 41 and the fixed camera 5 in the periphery of the site. The control unit 11 checks, on the basis of an analysis result from the image analysis unit 15 of the captured images acquired by the image collection unit 16, details of the emergency situation that are detected on the basis of the analysis result of the audio data of the emergency call or by analysis of monitored images of the on-board camera 41 and the fixed camera 5. This possibly enables more detailed information than the details of the emergency situation obtained from the analysis result of the audio data of the emergency call or the analysis result of the monitored images to be acquired.

Furthermore, in a case where the emergency situation is occurrence of an emergency patient, and personal information of the patient may be obtained and an individual may be specified, for example, the control unit 11 instructs the medical record acquisition unit 13 to acquire medical record information of the patient. Personal information for specifying an individual includes name, address, age, birthday, a patient ID in a predetermined medical organization, and the like, for example. Medical record information includes information about a clinic visit date, a visited department, a diagnosis, a prescription and the like, for example. The control unit 11 specifies, from the medical record information of the patient, presence/absence of a chronic disease, type of the chronic disease, a medicine being taken, and the like.

The control unit 11 outputs, to the type selection unit 12, a selection command for a main body unit 300, details of the report obtained by analysis of the audio data of the emergency call, and details of the emergency situation obtained from an analysis result of a peripheral image of the site or information about presence/absence of a chronic disease of the patient and the type of the chronic disease obtained from the medical record information.

The control unit 11 refers to the vehicle dispatch status table 17 described later, and determines the main body unit 300 and the traveling unit 200 to be dispatched, from the main body units 300 and the traveling units 200 stationed at the fire department having jurisdiction over the occurrence site of the emergency situation. Hereinafter, the fire department having jurisdiction over the occurrence site of the emergency situation will be simply referred to as a jurisdictional fire department. The main body unit 300 to be dispatched is the main body unit 300, of the type selected by the type selection unit 12, that is on standby, for example. The traveling unit 200 to be dispatched is the traveling unit 200 on standby, for example. The control unit 11 issues, through the vehicle communication unit 14, the coupling command and the dispatch command to the selected main body unit 300 and traveling unit 200.

For example, the main body unit 300 and the traveling unit 200 that received the dispatch command each transmit, to the center server 1, a captured image of the on-board camera every predetermined period. Alternatively, one of the main body unit 300 and the traveling unit 200 may transmit the captured image of the on-board camera to the center server 1. The vehicle communication unit 14 outputs, to the image analysis unit 15, the captured images received from the main body unit 300 and the traveling unit 200. The image analysis unit 15 analyzes the captured image input from the vehicle communication unit 14, and outputs an analysis result to the control unit 11.

When analysis results of the captured images from the traveling unit 200 and the main body unit 300 being dispatched are input from the image analysis unit 15, the control unit 11 determines whether additional dispatch of the emergency vehicle is necessary or not. For example, in a case where it is determined, from the captured images from the main body unit 300 and the traveling unit 200 being dispatched, that the number of target persons of emergency transport is increased than that at the time of the report, and that the target persons of the emergency transport cannot all be transported by the advance vehicle, the control unit 11 determines that additional dispatch of the emergency vehicle is necessary. Additionally, the control unit 11 may detect additional dispatch of the emergency vehicle on the basis of a contact from a rescue crew member at the site, for example.

In the case of determining additional dispatch of the emergency vehicle, the control unit 11 outputs, to the type selection unit 12, the selection command regarding the type of the main body unit 300. The analysis results of the captured images from the main body unit 300 and the traveling unit 200 being dispatched, and the like are also output together with the selection command, for example. Then, the coupling command and the dispatch command are transmitted to the main body unit 300 and the traveling unit 200 stationed at the jurisdictional fire department in the same manner as at the time of reception of the emergency call. The above analysis of the captured images from the main body unit 300 and the traveling unit 200 being dispatched is repeatedly performed until the main body unit 300 and the traveling unit 200 leave the site, for example.

In a case where there is a shortage regarding corresponding main body unit 300 or traveling unit 200 at the jurisdictional fire department at the time of reception of the emergency call or at the time of additional dispatch of the emergency vehicle, the control unit 11 may transmit the dispatch command to the main body unit 300 or the traveling unit 200 stationed at a nearby fire department.

Furthermore, in a case where the traveling unit 200 and the main body unit 300 that are coupled together and being dispatched are separated, the control unit 11 transmits, if there is a new demand for the traveling unit 200, a command according to the demand to the traveling unit 200. For example, this enables the traveling unit 200 from which the main body unit 300 is unloaded at the site to return to the fire department carrying another main body unit 300, or to move to an occurrence site of another emergency situation.

The type selection unit 12 selects the type of the main body unit 300 matching the emergency situation, according to the selection command from the control unit 11 regarding the type of the main body unit 300. As a method of selecting the type of the main body unit 300, there are a method of selecting on the basis of correspondence between types of emergency situations and types of main body units 300 to be dispatched set in advance, a method of selecting according to a predetermined algorithm, a method of using a learned model that outputs the type of main body unit 300 that is suitable for dispatch in response to input of a parameter regarding the emergency situation, and the like. The method of selecting the type of the main body unit 300 that is adopted by the type selection unit 12 is not limited to a specific method.

In response to an instruction from the control unit 11, the medical record acquisition unit 13 acquires the medical record information of a specified individual from the medical record management server 6. The medical record acquisition unit 13 outputs the acquired medical record information to the control unit 11.

The vehicle dispatch status table 17 is a table held in the external storage device 103. The vehicle dispatch status table 17 is a table for managing dispatch states of the traveling units 200 and the main body units 300 at each fire department under jurisdiction of the fire department headquarters that is the target of the center server 1. The control unit 11 determines the traveling unit 200 and the main body unit 300 to be dispatched, on the basis of the dispatch states of the traveling units 200 and the main body units 300 held in the vehicle dispatch status table 17. Details of the vehicle dispatch status table 17 will be given later.

Next, the traveling unit 200 includes a server communication unit 21 and a control unit 22 as functional elements. However, in FIG. 5, functional elements that perform processes related to the emergency-vehicle dispatch management system 100 are extracted and illustrated for the sake of convenience, and functional elements that perform processes related to traveling and the like, for example, are omitted.

The server communication unit 21 is a communication interface to the center server 1. The server communication unit 21 outputs data received from the center server 1 to the control unit 22. The server communication unit 21 transmits data input from the control unit 22 to the center server 1 through the communication unit 205. In the first embodiment, data that the traveling unit 200 receives from the center server 1 includes the coupling command for being coupled to a specified main body unit 300 and the dispatch command, for example. In the first embodiment, data that is transmitted from the traveling unit 200 to the center server 1 includes captured images of the camera 208, position information and the like, for example.

In response to the coupling command from the center server 1, the control unit 22 performs a coupling process with the specified main body unit 300. Furthermore, in response to the dispatch command from the center server 1, the control unit 22 starts traveling to the occurrence site of an emergency situation. Specifically, the control unit 22 creates an operation plan for reaching the site of the emergency situation, and travels according to the operation plan. Moreover, together with starting operation, the control unit 22 starts transmission of captured images of the camera 208 to the center server 1, the transmission being performed every predetermined period.

Next, as functional elements, the main body unit 300 includes a server communication unit 31 and a control unit 32. However, in FIG. 5, functional elements that perform processes related to the emergency-vehicle dispatch management system 100 are extracted and illustrated for the sake of convenience, and functional elements that perform processes related to traveling and the like, for example, are omitted.

The server communication unit 31 is a communication interface to the center server 1. The server communication unit 31 outputs data received from the center server 1 to the control unit 32. The server communication unit 31 transmits data input from the control unit 32 to the center server 1. In the first embodiment, data that the main body unit 300 receives from the center server 1 includes the coupling command for being coupled to a specified traveling unit 200 and the dispatch command, for example. In the first embodiment, data that is transmitted from the main body unit 300 to the center server 1 includes captured images of a camera mounted on the main body unit 300, position information and the like, for example.

In response to the coupling command and the dispatch command from the center server 1, the control unit 32 executes coupling the main body unit 300 with the specified traveling unit 200, and when traveling is started, the control unit 32 starts transmission of captured images of the camera mounted on the main body unit 300 to the center server 1, the transmission being performed every predetermined period.

Additionally, in the example illustrated in FIG. 5, both the traveling unit 200 and the main body unit 300 are described to regularly perform a process of transmitting captured images of the camera to the center server 1 when operation is started, but such a case is not restrictive. For example, regular transmission of captured images of the camera to the center server 1 may be performed by one of the traveling unit 200 and the main body unit 300.

Additionally, the functional elements of the center server 1 may each be implemented by a plurality of different devices, for example. Furthermore, the functional elements of the center server 1, the traveling unit 200, and the main body unit 300 may each be implemented by processing by hardware such as an FPGA.

FIG. 6 is an example of a dispatch vehicle information table. The dispatch vehicle information table is a table holding correspondence between types of emergency situations and types of main body units 300 to be dispatched. For example, the dispatch vehicle information table is a table that is used in a case where a method of selecting on the basis of the correspondence between types of emergency situations and types of main body units 300 to be dispatched that is set in advance is adopted as the method that is used by the type selection unit 12 of the center server 1 to determine the type of main body unit 300 to be dispatched. The dispatch vehicle information table is held in the external storage device 103 of the center server 1, for example.

The dispatch vehicle information table illustrated in FIG. 6 includes fields of "type of emergency situation", "dispatch vehicle #1", and "dispatch vehicle #2". In the field of "type of emergency situation", keywords indicating types of emergency situations are stored. Keywords indicating types of emergency situations may be "car accident", "fire", "explosion", "emergency patient", and the like, for example. In the field of "dispatch vehicle", keywords indicating types of main body units 300 to be dispatched are stored. Keywords indicating types of main body units 300 to be dispatched may be "general ambulance specifications", "treatment room specifications", "surgery room specifications (for each department)", "examination room specifications (for each department)", and the like. Additionally, the keywords indicating types of emergency situations and the keywords indicating types of main body units 300 are merely examples and are not restrictive.

In the example illustrated in FIG. 6, the fields of "dispatch vehicle" include "dispatch vehicle #1" and "dispatch vehicle #2". This indicates an order of priority regarding main body units 300 to be dispatched, for example. The type selection unit 12 outputs, to the control unit 11, the types of main body units 300 indicated in both fields of "dispatch vehicle #1" and "dispatch vehicle #2", for example.

In a case where the number of main body units 300 to be dispatched is one, the control unit 11 causes the main body unit 300 of the type indicated in the field of "dispatch vehicle #1" to be dispatched. For example, in a case where the number of main body units 300 to be dispatched is two, or in a case where another vehicle is to be further dispatched after the advance vehicle, the control unit 11 causes the main body unit 300 of the type indicated in the field of "dispatch vehicle #2" to be dispatched as the second main body unit 300 to be dispatched. Furthermore, types of main body units 300 that are stationed are possibly different between fire departments, and thus, in a case where the main body unit 300 of the type indicated in "dispatch vehicle #1" is not stationed at a fire department concerned, the control unit 11 may cause the main body unit 300 of the type indicated in "dispatch vehicle #2" to be dispatched.

For example, in a case where the type of an emergency situation obtained from analysis of audio data of an emergency call input from the control unit 11 indicates a car accident, the type selection unit 12 selects the main body unit 300 matching treatment room specifications as the type of main body unit 300 to be dispatched, according to the dispatch vehicle information table. Furthermore, for example, in a case where details of the emergency situation obtained from an analysis result of a peripheral image of the site indicate that the number of target persons of emergency transport is a predetermined number or more, the type selection unit 12 determines that two emergency vehicles are to be dispatched, and selects the main body unit 300 matching treatment room specifications indicated in the field of "dispatch vehicle #1", and the main body unit 300 matching general ambulance specifications indicated in the field of "dispatch vehicle #2".

Furthermore, for example, in a case where details of a report obtained from analysis of audio data of an emergency call input from the control unit 11 indicate an emergency patient, and the chronic disease of the patient obtained from the medical record information is a cranial nerve-related disease, the type selection unit 12 selects the main body unit 300 matching cranial-nerve examination room specifications as the type of main body unit 300 to be dispatched, according to the dispatch vehicle information table.

Additionally, information pieces to be held in the dispatch vehicle information table are not limited to those illustrated in FIG. 6. Moreover, in a case where, for example, the type selection unit 12 uses a method of using the learned model, and a level of injury of a person who needs emergency transport is specified from a captured image of the site and is input from the control unit 11, the type selection unit 12 may select the main body unit 300 equipped with a facility for treatment according to the level of injury of the person.

FIG. 7 is an example of the vehicle dispatch status table 17. The vehicle dispatch status table is created for each fire department under jurisdiction of the fire department headquarters corresponding to the center server 1. The vehicle dispatch status table illustrated in FIG. 7 includes fields of "ID", "specifications", "dispatch status", and "coupling counterpart".

In the field of "ID", identification information of each traveling unit 200 and main body unit 300 stationed at the fire department is stored. Additionally, a method of structuring the identification information may be made different between the traveling unit 200 and the main body unit 300 to enable the identification information to be identified as that of the traveling unit 200 or the main body unit 300.

In the field of "specifications", keywords indicating types of main body units 300 are stored. Additionally, in entries of traveling units 200, the field of "specifications" is empty. In the field of "dispatch status", information indicating a dispatch status of a corresponding traveling unit 200 or main body unit 300 is stored. For example, the dispatch status may be "on standby" or "dispatched". Additionally, the dispatch statuses of the traveling unit 200 and the main body unit 300 are not limited to the above. Information indicating the dispatch status may be a flag or a code indicating one of "on standby" and "dispatched", for example.

In the field of "coupling counterparty", the identification information of the main body unit 300 or the traveling unit 200 that is a coupling counterparty of the corresponding traveling unit 200 or main body unit 300 is stored. Additionally, the field of "coupling counterparty" is empty for the traveling unit 200 or the main body unit 300, the field of "dispatch status" for which is "on standby". Additionally, information pieces to be held in the vehicle dispatch status table 17 are not limited to those illustrated in FIG. 7.

<Flow of Processes>

Figure 8:
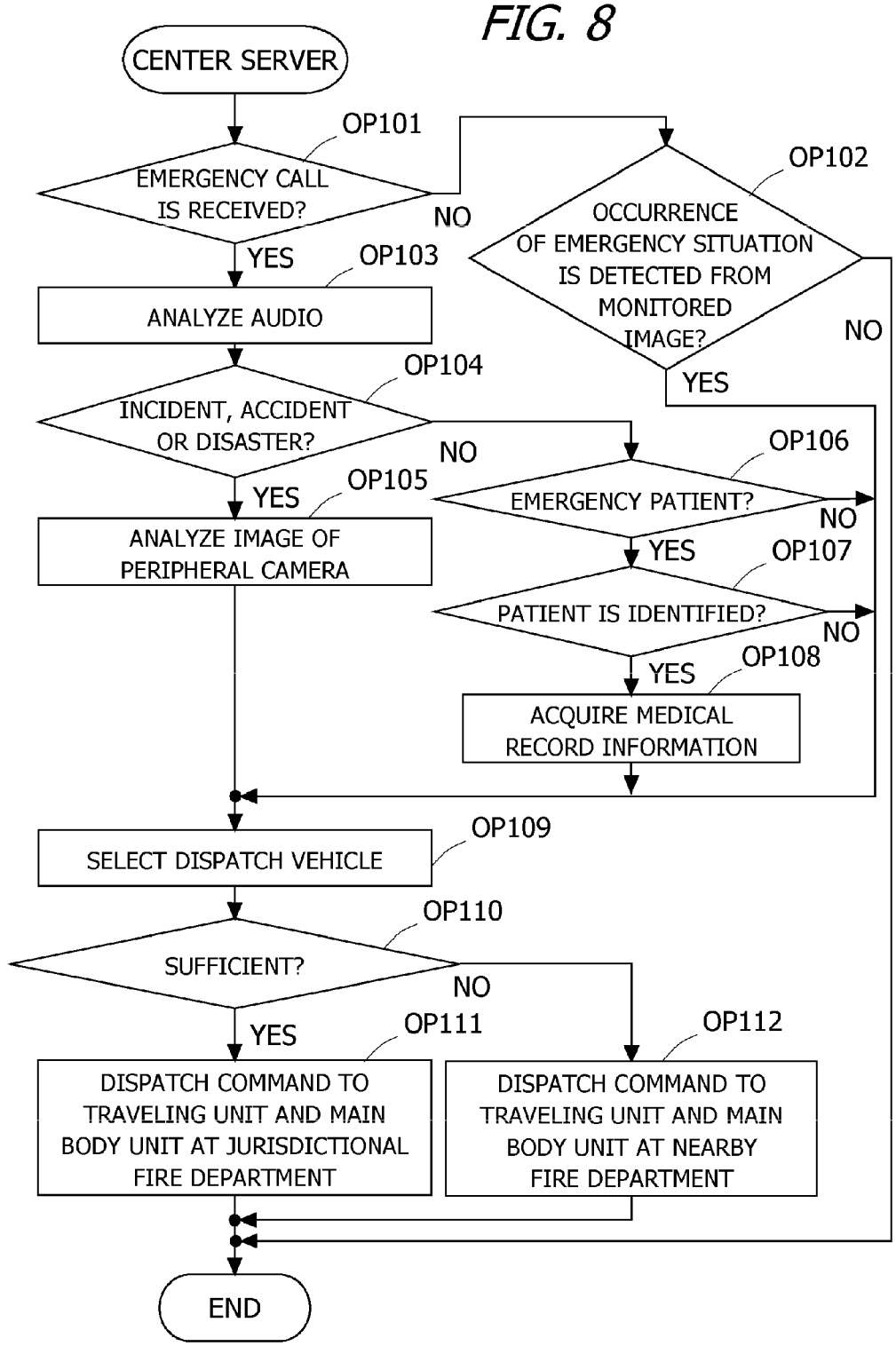
FIG. 8 is an example of a flowchart of a dispatch control process for the emergency vehicle performed by the center server.

FIG. 8 is an example of a flowchart of a dispatch control process for the emergency vehicle performed by the center server 1. The process illustrated in FIG. 8 is repeated every predetermined period. A performer of the process illustrated in FIG. 8 is the CPU 101 of the center server 1, but a description will be given taking a functional element as the performer for the sake of convenience. The same applies to flowcharts in drawings subsequent to FIG. 8.

In OP101, the control unit 11 determines whether an emergency call is received or not. In a case where an emergency call is received (OP101: YES), the process proceeds to OP103. In a case where an emergency call is not received (OP101: NO), the process proceeds to OP102.

In OP102, the control unit 11 determines whether or not occurrence of an emergency situation is detected from captured images (monitored images) of the on-board camera 41 of the vehicle 4 and the fixed camera 5. In a case where occurrence of an emergency situation is detected from the monitored images (OP102: YES), the process proceeds to OP109. In a case where occurrence of an emergency situation is not detected from the monitored images (OP102: NO), the process illustrated in FIG. 8 is ended.

In OP103, the control unit 11 analyzes audio data of the received emergency call, and acquires details of the emergency call. Details of the emergency call that are acquired in OP103 as a result of analysis of the audio data are at least one or more among the type of the emergency situation, the occurrence location of the emergency situation, an attribute of the target person of emergency transport, a state of the target person of emergency transport, a reception time of the emergency call, and the like, for example.

In OP104, the control unit 11 determines whether or not the type of the emergency situation is an incident, an accident, or a disaster. In a case where the type of the emergency situation is an incident, an accident, or a disaster (OP104: YES), the process proceeds to OP105. In a case where the type of the emergency situation is other than an incident, an accident, and a disaster (OP104:NO), the process proceeds to OP106.

In OP105, the control unit 11 instructs the image collection unit 16 to collect a captured image of surroundings of the site, and instructs the image analysis unit 15 to analyze the captured image collected by the image collection unit 16, and thereby grasps the state of the site. This enables the details of the emergency call to be checked, and/or more detailed information about the site to be acquired.

In OP106, the control unit 11 determines whether or not the type of the emergency situation is an emergency patient. In a case where the type of the emergency situation is an emergency patient (OP106: YES), the process proceeds to OP107. In a case where the type of the emergency situation is not an emergency patient (OP106: NO), the process proceeds to OP109.

In OP107, the control unit 11 determines whether or not the patient is identified as an individual from the details of the emergency call. In a case where the patient is identified as an individual (OP107: YES), the process proceeds to OP108. In a case where the patient is not identified as an individual (OP107: NO), the process proceeds to OP109.

In OP108, the control unit 11 instructs the medical record acquisition unit 13 to acquire medical record information of the patient, and acquires the medical record information through the medical record acquisition unit 13. This enables to specify presence/absence of a chronic disease of the patient, the type of the chronic disease, and the like.

In OP109, the control unit 11 outputs, to the type selection unit 12, the selection command regarding the type of the main body unit 300 to be dispatched. The type selection unit 12 determines the type of the main body unit 300 to be dispatched, on the basis of information that is acquired at a current time point among the analysis result of the audio data of the emergency call, the analysis result of the captured image of the camera in the periphery of the site, the medical record information of the patient, and the like. The control unit 11 determines the traveling unit 200 and the main body unit 300 to be dispatched among the traveling units 200 and the main body units 300 stationed at the jurisdictional fire department, according to the type of the main body unit 300 to be dispatched that is selected by the type selection unit 12.

In OP110, the control unit 11 determines whether or not the traveling unit 200 and the main body unit 300 stationed at the fire department having jurisdiction over the emergency situation are sufficient, or in other words, whether or not a traveling unit 200 and a main body unit 300 that can be dispatched exist at the fire department. This determination is performed by referring to the vehicle dispatch status table 17, for example. In a case where, for example, there is a shortage, at the jurisdictional fire department, regarding one of the traveling unit 200 and the main body unit 300 of the type determined in OP109 that is to be dispatched, for example, the determination in OP110 is a negative determination.

In a case where the traveling unit 200 and the main body unit 300 stationed at the jurisdictional fire department are sufficient (OP110: YES), the process proceeds to OP111. In a case where there is a shortage regarding the traveling unit 200 and the main body unit 300 stationed at the jurisdictional fire department (OP110: NO), the process proceeds to OP112.

In OP111, the control unit 11 transmits the coupling command and the dispatch command to the traveling unit 200 and the main body unit 300 of the type that is determined to be dispatched, that are stationed at the jurisdictional fire department. Then, the emergency vehicle 500 formed by coupling of the traveling unit 200 and the main body unit 300 that received the dispatch command swiftly moves to the occurrence site of the emergency situation. Then, the process illustrated in FIG. 8 is ended.

In OP112, since there is a shortage regarding the traveling unit 200 or the main body unit 300 at the jurisdictional fire department, the control unit 11 transmits the coupling command and the dispatch command to the traveling unit 200 and the main body unit 300 of the type determined to be dispatched, that are stationed at a nearby fire department. The emergency vehicle 500 that is formed by coupling of the traveling unit 200 and the main body unit 300 that received the dispatch command thus swiftly moves to the occurrence site of the emergency situation from the fire department in the periphery of the jurisdictional fire department. Then, the process illustrated in FIG. 8 is ended.

Additionally, the process illustrated in FIG. 8 is merely an example, and the process by the center server 1 is not limited to the process illustrated in FIG. 8. For example, the process in OP105 of analyzing an image of the surroundings of the occurrence site of the emergency situation may be performed in relation to reports of any details. Furthermore, the process in OP108 of acquiring the medical record information may be performed even in a case where the details of a report do not indicate occurrence of an emergency patient, if the target person of emergency transport may be identified as an individual.

Figure 9:
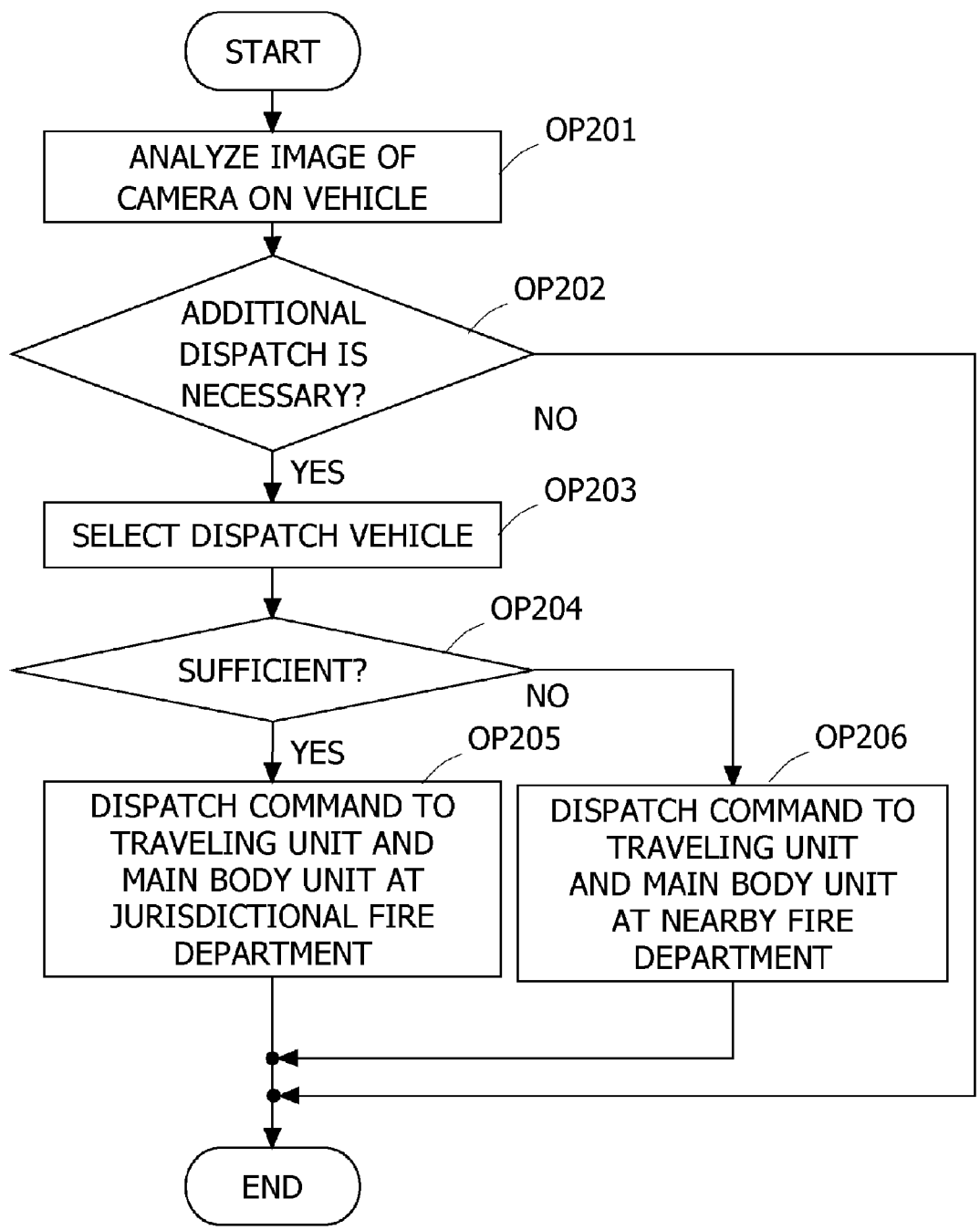
FIG. 9 is an example of a control process for additional dispatch of the emergency vehicle performed by the center server.

FIG. 9 is an example of a control process for additional dispatch of the emergency vehicle performed by the center server 1. The process illustrated in FIG. 9 is started when the dispatch command is transmitted to the traveling unit 200 and the main body unit 300, for example, and is repeatedly performed. Repeated performance of the process illustrated in FIG. 9 is ended when the traveling unit 200 and the main body unit 300 leave the occurrence site of an emergency situation, for example. Additionally, leaving of the traveling unit 200 and the main body unit 300 from the occurrence site of an emergency situation is detected from the position information of the traveling unit 200 or the main body unit 300, for example. The traveling unit 200 and the main body unit 300 in FIG. 9 are assumed to be the traveling unit 200 and the main body unit 300 that are targets of the dispatch command.

As a premise for the process illustrated in FIG. 9, the traveling unit 200 and the main body unit 300 that are being dispatched regularly transmit the position information and captured images of the cameras to the center server 1. When the captured images are received from the traveling unit 200 and the main body unit 300, the center server 1 performs image analysis by the image analysis unit 15 as appropriate.

In OP201, the control unit 11 receives, from the image analysis unit 15, input of analysis results of captured images of cameras of the traveling unit 200 and the main body unit 300. In OP202, the control unit 11 determines whether or not additional dispatch of the emergency vehicle is necessary. For example, additional dispatch of the emergency vehicle is determined to be necessary in a case where, according to a result of image analysis from the image analysis unit 15, the number of persons needing emergency transport is increased by a predetermined number or more from that at the time of reception of the emergency call. Additionally, the condition for determining additional dispatch of the emergency vehicle is not limited to the above.

In a case where additional dispatch of the emergency vehicle is determined to be necessary (OP202: YES), the process proceeds to OP203. In a case where additional dispatch of the emergency vehicle is not determined to be necessary (OP202: NO), the process illustrated in FIG. 9 is ended.

In OP203, the control unit 11 instructs the type selection unit 12 to select the type of the main body unit 300 to be dispatched. For example, the type selection unit 12 determines the type of the main body unit 300 to be dispatched, on the basis of an analysis result of audio data of the emergency call and the image analysis result acquired in OP201.

In OP204, the control unit 11 determines whether or not the traveling unit 200 and the main body unit 300 stationed at the jurisdictional fire department of the emergency situation are sufficient, or in other words, whether or not traveling unit 200 and the main body unit 300 that can be additionally dispatched are present at the fire department. This determination is performed by referring to the vehicle dispatch status table 17, for example. In a case where there is a shortage, at the jurisdictional fire department, regarding one of the traveling unit 200 and the main body unit 300 of the type determined in OP203 that is to be dispatched, for example, the determination in OP204 is a negative determination.

In a case where the traveling unit 200 and the main body unit 300 stationed at the jurisdictional fire department are sufficient (OP204: YES), the process proceeds to OP205. In a case where the traveling unit 200 and the main body unit 300 stationed at the jurisdictional fire department are not sufficient (OP204: NO), the process proceeds to OP206.

In OP205, the control unit 11 transmits the coupling command and the dispatch command to the traveling unit 200 and the main body unit 300 of the type that is determined to be dispatched, that are station at the jurisdictional fire department. Then, the process illustrated in FIG. 9 is ended.

In OP206, since there is a shortage regarding the traveling unit 200 or the main body unit 300 at the jurisdictional fire department, the control unit 11 transmits the coupling command and the dispatch command to the traveling unit 200 and the main body unit 300 of the type determined to be dispatched, that are stationed at a nearby fire department. The process illustrated in FIG. 9 is then ended. Additionally, the process illustrated in FIG. 9 may be started for the traveling unit 200 and the main body unit 300 that are additionally dispatched. Moreover, the process illustrated in FIG. 9 is merely an example, and the process by the center server 1 is not limited to the process illustrated in FIG. 9.

Figure 10:
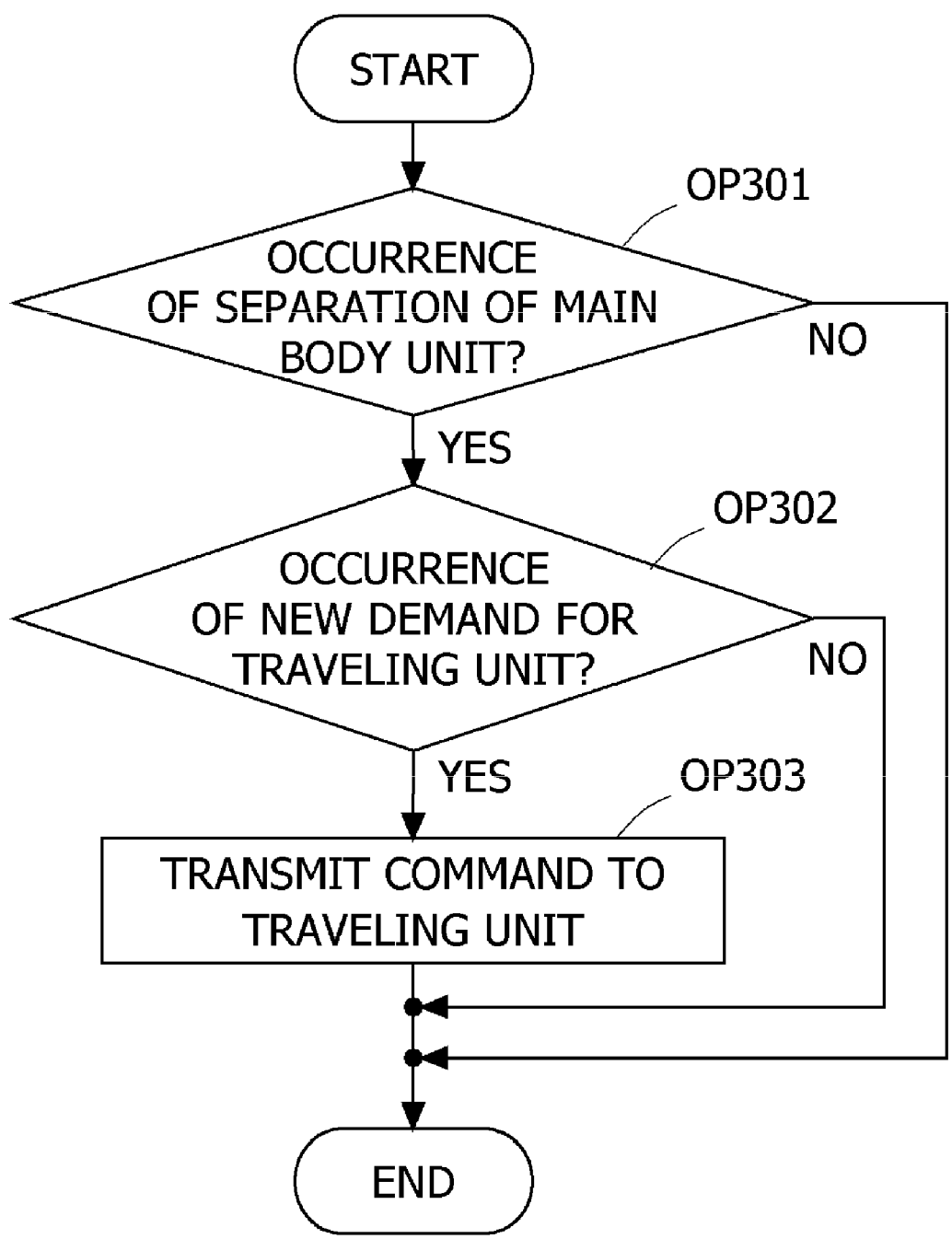
FIG. 10 is an example of a flowchart of a control process for the traveling unit that is being dispatched, performed by the center server.

FIG. 10 is an example of a flowchart of a control process for the traveling unit 200 that is being dispatched, performed by the center server 1. The process illustrated in FIG. 10 is a process for using the traveling unit 200 in a case where the traveling unit 200 and the main body unit 300 are separated at a destination of dispatch of the emergency vehicle 500. For example, when a main body unit 300B and a traveling unit 200B of a subsequently arriving emergency vehicle 500B are separated in a state where a main body unit 300A of an advance vehicle is separated from a traveling unit 200A and disposed, there may be a demand for the traveling unit 200B to transport the main body unit 300A to a specific location. Furthermore, a demand may also arise at a destination of transport of the main body unit 300A by the traveling unit 200B, to transport another main body unit 300C to another location.

The process illustrated in FIG. 10 is performed for the traveling unit 200 that is being dispatched and that is being coupled with a main body unit. The process illustrated in FIG. 10 is repeatedly performed while the traveling unit 200 is being dispatched.

In OP301, the control unit 11 determines whether or not there is occurrence of separation between the traveling unit 200 and the main body unit 300 that are being dispatched. Separation between the traveling unit 200 and the main body unit 300 is detected on the basis of input of a separation instruction from an administrator to the center server 1, reception of a separation request from a terminal to the center server 1 issued by a crew member at the site, or a report from the main body unit 300 based on input of a separation instruction to the main body unit 300 from a crew member at the site, for example.

In a case where there is occurrence of separation between the traveling unit 200 and the main body unit 300 that are being dispatched (OP301: YES), the process proceeds to OP302. In a case where there is no occurrence of separation between the traveling unit 200 and the main body unit 300 that are being dispatched (OP301: NO), the process illustrated in FIG. 10 is ended.

In OP302, the control unit 11 determines whether or not there is occurrence of a new demand for the traveling unit 200. There are various demands for the traveling unit 200, including a dispatch demand caused by occurrence of an emergency situation at another location, and a transport demand at the site regarding another main body unit 300, for example. These demands are detected by occurrence of an emergency call, detection of an emergency situation by the center server 1, input from an administrator to the center server 1, reception of a request from a terminal to the center server 1 issued by a crew member at the site, reception of a request from the main body unit 300 based on input of an instruction to the main body unit 300 by a crew member at the site, and the like.

In a case where there is occurrence of a new demand for the traveling unit 200 (OP302: YES), the process proceeds to OP303. In a case where there is no occurrence of a new demand for the traveling unit 200 (OP302: NO), the process illustrated in FIG. 10 is ended.

In OP303, the control unit 11 transmits a command to the traveling unit 200, according to the demand for the traveling unit 200. For example, commands that are transmitted to the traveling unit 200 include the coupling command for being coupled to the new main body unit 300 and a move command to move to a specified location. The process illustrated in FIG. 10 is then ended. Additionally, the process illustrated in FIG. 10 is merely an example, and the process by the center server 1 is not limited to the process illustrated in FIG. 10.

Advantages and Effects

According to the first embodiment, a main body unit 300 equipped with a facility matching details of an emergency call is dispatched, and thus, an emergency situation may be more swiftly and appropriately handled. Furthermore, in the first embodiment, a separable vehicle in which the traveling unit 200 and the main body unit 300 are separated from each other is adopted as the emergency vehicle, and thus, a greater number of main body units 300 compared to the number of traveling units 200 may be stationed at each fire department.

Furthermore, according to the first embodiment, when an emergency call is received, the center server 1 collects and analyzes captured images of the on-board camera 41 and the fixed camera 5 in the periphery of the occurrence site of the emergency situation, and thereby checks details of the emergency call or acquires more detailed information. The center server 1 may thus acquire more accurate information, and may select the main body unit 300 of a type that is capable of more appropriately handling the emergency situation.

Furthermore, according to the first embodiment, in a case where there is a shortage regarding the traveling unit 200 or the main body unit 300 at the jurisdictional fire department, the center server 1 causes the traveling unit 200 and the main body unit 300 stationed at a nearby fire department to be dispatched. Occurrence of a situation where an emergency vehicle cannot be dispatched to a site due to a shortage of emergency vehicles may thus be prevented.

Furthermore, according to the first embodiment, the center server 1 analyzes captured images of cameras from the traveling unit 200 and the main body unit 300 that are being dispatched, determines whether or not additional dispatch of the emergency vehicle is necessary, and causes an additional emergency vehicle to be dispatched if necessary. The state at the occurrence site of an emergency situation may be acquired in real time from the captured images from the traveling unit 200 and the main body unit 300 that are being dispatched, and determination regarding additional dispatch may then be made, and an additional emergency vehicle may be more swiftly dispatched.

Moreover, according to the first embodiment, in a case where the traveling unit 200 and the main body unit 300 that are being dispatched are separated, the center server 1 issues an instruction to the traveling unit 200 according to a new demand for the traveling unit 200. The utilization rate of the traveling unit 200 is thereby increased, and the traveling unit 200 may efficiently transport the main body units 300 by being coupled to, and transporting, a new main body unit 300, for example.

Other Embodiments

The embodiment described above is an example, and the present disclosure may be changed and carried out as appropriate without departing from the gist of the present disclosure.

In the first embodiment, a description is given assuming that the emergency vehicle is an ambulance, but the emergency vehicle 500 according to the first embodiment may be a fire engine. In this case, the main body unit 300 is equipped with a fire-fighting facility.

In the first embodiment, in a case where there is a shortage regarding the traveling unit 200 or the main body unit 300 at the jurisdictional fire department, the dispatch command is transmitted to the traveling unit 200 and the main body unit 300 stationed at a nearby fire department. Such a case is not restrictive, and control may be performed such that only the traveling unit 200 or only the main body unit 300 is dispatched from a nearby fire department, in which case the traveling unit 200 is moved under the main body unit 300 to be coupled and then to head for the site, for example.

The processes and means described in the present disclosure may be freely combined to the extent that no technical conflict exists.

A process which is described to be performed by one device may be performed divided among a plurality of devices. Processes described to be performed by different devices may be performed by one device. Each function is to be implemented by which hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

<Notes>

The disclosed embodiment further discloses the following notes.

(Note 1)

A system comprising:
a traveling unit provided with a movement mechanism;
a plurality of types of main body units equipped with different facilities, each main body unit being configured to form an emergency vehicle by being coupled with the traveling unit; and
an information processing apparatus configured to manage the traveling unit and the plurality of types of main body units, wherein
the information processing apparatus includes a processor configured to:
analyze details of a first emergency call made to a fire-fighting organization;
select a main body unit of a first type equipped with a facility matching the details of the first emergency call from the plurality of types of main body units; and
dispatch an emergency vehicle coupling the main body unit of the first type and the traveling unit.

(Note 2)

The system according to Note 1, wherein the processor is configured to:
analyze a captured image of a camera existing in a periphery of an occurrent site of an emergency situation corresponding to the first emergency call to check a state of the occurrence site; and
select the main body unit of the first type based on an analysis result of the details of the first emergency call and an analysis result of the captured image of the camera.

(Note 3)

The system according to Note 1 or 2, wherein the processor is configured to:
acquire medical record information of a target person of emergency transport that is based on the first emergency call; and
select the main body unit of the first type based on the medical record information of the target person of the emergency transport.

(Note 4)

The system according to any one of Notes 1 to 3, wherein the processor is configured to analyze a captured image of a camera provided on at least one of the main body unit of the first type and the traveling unit, the captured image capturing surroundings of an occurrence site of an emergency situation corresponding to the first emergency call to determine additional dispatch of an emergency vehicle.

(Note 5)

The system according to Note 4, wherein, when there is a shortage, at a first fire department having jurisdiction over an occurrence site of the emergency situation, regarding at least one of the main body unit of the first type and the traveling unit that are to be additionally dispatched, the processor transmits a dispatch command to at least one of the main body unit of the first type and the traveling unit stationed at a fire department near the first fire department.

(Note 6)

The system according to any one of Notes 1 to 5, wherein
the information processing apparatus further includes a memory configured to store correspondence between a type of details of an emergency call and a type of a main body unit to be dispatched, and
the processor is configured to determine the main body unit of the first type matching the details of the first emergency call based on the correspondence stored in the memory.

(Note 7)

The system according to any one of Notes 1 to 5, wherein the processor is configured to input a parameter obtained from the details of the first emergency call to a learning model learned using a parameter obtained from an emergency call and a type of a main body unit to be dispatched, and determines the main body unit of the first type.

(Note 8)

The system according to any one of Notes 1 to 7, wherein the processor is configured to:

collect a captured image of an on-board camera or a fixed camera existing within a jurisdictional range, and monitor occurrence of a second emergency situation within the jurisdictional range;

select, when there is occurrence of the second emergency situation within the jurisdictional range, a main body unit of a second type equipped with a facility matching the second emergency situation from the plurality of types of main body units; and dispatch an emergency vehicle coupling the main body unit of the second type and the traveling unit.

(Note 9)

An information processing apparatus comprising a processor configured to:

analyze details of a first emergency call made to a fire-fighting organization;

select a main body unit of a first type equipped with a facility matching the details of the first emergency call, from a plurality of types of main body units equipped with different facilities, each main body unit being configured to form an emergency vehicle by being coupled with a traveling unit provided with a movement mechanism; and dispatch an emergency vehicle coupling the main body unit of the first type and the traveling unit.

(Note 10)

An information processing method comprising: analyzing details of a first emergency call made to a fire-fighting organization;

selecting a main body unit of a first type equipped with a facility matching the details of the first emergency call, from a plurality of types of main body units equipped with different facilities, each main body unit being configured to form an emergency vehicle by being coupled with a traveling unit provided with a movement mechanism; and dispatching an emergency vehicle coupling the main body unit of the first type and the traveling unit.

(Note 11)

A traveling unit configured to form a vehicle by being coupled with a main body unit, the traveling unit including a processor configured to:

receive a coupling command for being coupled to a main body unit of a first type that is selected based on details of a first emergency call made to a fire-fighting organization and that is equipped with a facility matching the details of the first emergency call, and a dispatch command for traveling to an occurrence site of an emergency situation corresponding to the first emergency call after being coupled to the main body unit of the first type, and control coupling to the main body unit of the first type, and traveling to the occurrence site of the emergency situation.

(Note 12)

The traveling unit according to Note 11, further including a camera that is installed facing outward, wherein when the dispatch command is received, the processor is configured to transmit a captured image of the camera to a transmission source of the dispatch command every predetermined period.

What is claimed is:

1. A system comprising:
a traveling unit provided with a movement mechanism;
a plurality of types of main body units equipped with different facilities, each main body unit being configured to form an emergency vehicle by being coupled with the traveling unit; and
an information processing apparatus configured to manage the traveling unit and the plurality of types of main body units, wherein
the information processing apparatus includes a processor configured to:
analyze details of a first emergency call made to a fire-fighting organization;
select a main body unit of a first type equipped with a facility matching the details of the first emergency call from the plurality of types of main body units;
dispatch an emergency vehicle coupling the main body unit of the first type and the traveling unit; and
when there is a shortage, at a first fire department having jurisdiction over an occurrence site of an emergency situation corresponding to the first emergency call, regarding at least one of the main body unit of the first type and the traveling unit to be dispatched, transmit a dispatch command to at least one of the main body unit of the first type and the traveling unit stationed at a fire department near the first fire department.

2. The system according to claim 1, wherein the processor is configured to:
analyze a captured image of a camera existing in a periphery of the occurrence site of the emergency situation corresponding to the first emergency call to check a state of the occurrence site; and
select the main body unit of the first type based on an analysis result of the details of the first emergency call and an analysis result of the captured image of the camera.

3. The system according to claim 1, wherein the processor is configured to:
acquire medical record information of a target person of emergency transport that is based on the first emergency call; and
select the main body unit of the first type based on the medical record information of the target person of the emergency transport.

4. The system according to claim 1, wherein the processor is configured to analyze a captured image of a camera provided on at least one of the main body unit of the first type and the traveling unit, the captured image capturing surroundings of the occurrence site of the emergency situation corresponding to the first emergency call to determine additional dispatch of an emergency vehicle.

5. The system according to claim 1, wherein
the information processing apparatus further includes a memory configured to store correspondence between a type of details of an emergency call and a type of a main body unit to be dispatched, and
the processor is configured to determine the main body unit of the first type matching the details of the first emergency call based on the correspondence stored in the memory.

6. The system according to claim 1, wherein the processor is configured to input a parameter obtained from the details of the first emergency call to a learning model learned using a parameter obtained from an emergency call and a type of a main body unit to be dispatched, and determines the main body unit of the first type.

7. The system according to claim 1, wherein the processor is configured to:
collect a captured image of an on-board camera or a fixed camera existing within a jurisdictional range, and monitor occurrence of a second emergency situation within the jurisdictional range;
select, when there is occurrence of the second emergency situation within the jurisdictional range, a main body unit of a second type equipped with a facility matching the second emergency situation from the plurality of types of main body units; and
dispatch an emergency vehicle coupling the main body unit of the second type and the traveling unit.

8. The system according to claim 1, wherein, when the traveling unit and the main body unit of the first type that are coupled together as the emergency vehicle are separated, the processor is configured to cause the traveling unit to perform a predetermined process according to a new demand for dispatch, according to the new demand for dispatch of the traveling unit.

9. An information processing apparatus comprising a processor configured to:
analyze details of a first emergency call made to a fire-fighting organization;
select a main body unit of a first type equipped with a facility matching the details of the first emergency call, from a plurality of types of main body units equipped with different facilities, each main body unit being configured to form an emergency vehicle by being coupled with a traveling unit provided with a movement mechanism;
dispatch an emergency vehicle coupling the main body unit of the first type and the traveling unit; and
when there is a shortage, at a first fire department having jurisdiction over an occurrence site of an emergency situation corresponding to the first emergency call, regarding at least one of the main body unit of the first type and the traveling unit to be dispatched, transmit a dispatch command to at least one of the main body unit of the first type and the traveling unit stationed at a fire department near the first fire department.

10. The information processing apparatus according to claim 9, wherein the processor is configured to:
analyze a captured image of a camera existing in a periphery of the occurrence site of the emergency situation corresponding to the first emergency call to check a state of the occurrence site: and
select the main body unit of the first type based on an analysis result of the details of the first emergency call and an analysis result of the captured image of the camera.

11. The information processing apparatus according to claim 9, wherein the processor is configured to:
acquire medical record information of a target person of emergency transport that is based on the first emergency call; and
select the main body unit of the first type based on the medical record information of the target person of the emergency transport.

12. The information processing apparatus according to claim 9, wherein the processor is configured to analyze a captured image of a camera provided on at least one of the main body unit of the first type and the traveling unit, the captured image capturing surroundings of the occurrence site of the emergency situation corresponding to the first emergency call to determine additional dispatch of an emergency vehicle.

13. The information processing apparatus according to claim 9, wherein
the information processing apparatus further comprises a memory configured to store correspondence between a type of details of an emergency call and a type of a main body unit to be dispatched, and
the processor is configured to determine the main body unit of the first type matching the details of the first emergency call based on the correspondence stored in the memory.

14. The information processing apparatus according to claim 9, wherein the processor is configured to input a parameter obtained from the details of the first emergency call to a learning model learned using a parameter obtained from an emergency call and a type of a main body unit to be dispatched, and determine the main body unit of the first type.

15. The information processing apparatus according to claim 9, wherein the processor is configured to:
collect a captured image of an on-board camera or a fixed camera existing within a jurisdictional range, and monitor occurrence of a second emergency situation within the jurisdictional range;
select, when there is occurrence of the second emergency situation within the jurisdictional range, a main body unit of a second type equipped with a facility matching the second emergency situation from the plurality of types of main body units; and
dispatch an emergency vehicle coupling the main body unit of the second type and the traveling unit.

16. The information processing apparatus according to claim 9, wherein, when the traveling unit and the main body unit of the first type that are coupled together as the emergency vehicle are separated, the processor is configured to cause the traveling unit to perform a predetermined process according to a new demand for dispatch, according to the new demand for dispatch of the traveling unit.

17. An information processing method comprising:
analyzing details of a first emergency call made to a fire-fighting organization;
selecting a main body unit of a first type equipped with a facility matching the details of the first emergency call, from a plurality of types of main body units equipped with different facilities, each main body unit being configured to form an emergency vehicle by being coupled with a traveling unit provided with a movement mechanism;
dispatching an emergency vehicle coupling the main body unit of the first type and the traveling unit; and
when there is a shortage, at a first fire department having jurisdiction over an occurrence site of an emergency situation corresponding to the first emergency call, regarding at least one of the main body unit of the first type and the traveling unit to be dispatched, transmitting a dispatch command to at least one of the main body unit of the first type and the traveling unit stationed at a fire department near the first fire department.

18. The information processing method according to claim 17, further comprising analyzing a captured image of a camera provided on at least one of the main body unit of the first type and the traveling unit, the captured image capturing surroundings of the occurrence site of the emergency situation corresponding to the first emergency call, and
determining additional dispatch of an emergency vehicle.

* * * * *